United States Patent
Morimoto

(10) Patent No.: US 10,801,767 B2
(45) Date of Patent: Oct. 13, 2020

(54) REFRIGERATION CYCLE APPARATUS

(71) Applicant: Mitsubishi Electric Corporation, Tokyo (JP)

(72) Inventor: Kota Morimoto, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 20 days.

(21) Appl. No.: 16/308,646

(22) PCT Filed: Sep. 6, 2016

(86) PCT No.: PCT/JP2016/076200
§ 371 (c)(1),
(2) Date: Dec. 10, 2018

(87) PCT Pub. No.: WO2018/047238
PCT Pub. Date: Mar. 15, 2018

(65) Prior Publication Data
US 2019/0271494 A1 Sep. 5, 2019

(51) Int. Cl.
*F25B 49/02* (2006.01)
*F25B 13/00* (2006.01)
(Continued)

(52) U.S. Cl.
CPC ............ *F25B 49/025* (2013.01); *F24F 11/86* (2018.01); *F24F 11/871* (2018.01); *F25B 1/00* (2013.01);
(Continued)

(58) Field of Classification Search
CPC .... F25B 49/022; F25B 49/025; F25B 49/027; F25B 2313/0294; F25B 2500/19;
(Continued)

(56) References Cited

U.S. PATENT DOCUMENTS 6,594,554 B1 7/2003 Seem et al.
2006/0021362 A1* 2/2006 Sadegh ............... F25B 49/005
62/129
(Continued)

FOREIGN PATENT DOCUMENTS

CN 1291704 A 4/2001
CN 102472541 A * 5/2012 .......... F25D 21/006
(Continued)

OTHER PUBLICATIONS

Extended European Search Report dated Aug. 9, 2018 in the corresponding European Patent Application No. 16 90 6496.1.
Chinese Office Action dated Jun. 3, 2020 in the corresponding CN Patent Application No. 201680088699.9( and English translation).

*Primary Examiner* — Nelson J Nieves
(74) *Attorney, Agent, or Firm* — Posz Law Group, PLC

(57) ABSTRACT

A refrigeration cycle apparatus includes a refrigerant circuit, a high-side pressure sensor, an outside air temperature sensor, an outdoor fan, a fan driving unit, and a controller. The controller includes a pressure prediction unit that predicts, based on a high-side pressure detected by the high-side pressure sensor, a predicted value of high-side pressure at the elapse of a set time, a fan rotation speed control unit that, during cooling operation in which an indoor heat exchanger acts as an evaporator, adjusts the rotation speed of the fan driving unit based on the outside air temperature detected by the outside air temperature sensor and the operating capacity of an indoor unit, and an intermittent fan control unit that, if the fan driving unit is running at a set lower limit rotation speed, and if the high-side pressure is below a target value, controls the fan driving unit to perform intermittent operation, the intermittent operation being performed by setting an ON time and an OFF time such that the predicted value predicted by the pressure prediction unit approaches the target value.

9 Claims, 5 Drawing Sheets

(51) Int. Cl.
*F24F 11/871* (2018.01)
*F25B 1/00* (2006.01)
*G05B 13/04* (2006.01)
*F24F 11/86* (2018.01)
*F25B 39/04* (2006.01)
*F24F 110/12* (2018.01)
*F24F 110/40* (2018.01)

(52) U.S. Cl.
CPC .............. F25B 13/00 (2013.01); F25B 39/04 (2013.01); F25B 49/027 (2013.01); G05B 13/048 (2013.01); *F24F 2110/12* (2018.01); *F24F 2110/40* (2018.01); *F25B 2313/0294* (2013.01); *F25B 2313/031* (2013.01); *F25B 2339/04* (2013.01); *F25B 2500/19* (2013.01); *F25B 2500/31* (2013.01); *F25B 2600/112* (2013.01); *F25B 2700/1931* (2013.01); *F25B 2700/1933* (2013.01); *F25B 2700/21* (2013.01); *F25B 2700/2106* (2013.01); *F25B 2700/2117* (2013.01); *F25B 2700/21161* (2013.01); *Y02B 30/743* (2013.01)

(58) Field of Classification Search
CPC ............ F25B 2600/11; F25B 2600/111; F25B 2600/112; F25B 2700/1931; F24F 11/87; F24F 11/871; F24F 2110/40; F24F 2110/12
See application file for complete search history.

(56) References Cited

U.S. PATENT DOCUMENTS

| | | | | |
|---|---|---|---|---|
| 2011/0132011 | A1* | 6/2011 | Kojima | F24F 11/77 62/180 |
| 2015/0219376 | A1* | 8/2015 | Douglas | F25B 49/02 62/115 |
| 2015/0300714 | A1* | 10/2015 | Ishimura | F25B 31/006 62/225 |
| 2016/0320110 | A1* | 11/2016 | Ishida | F25B 49/02 |
| 2016/0356534 | A1* | 12/2016 | Hatada | F25B 13/00 |
| 2016/0377333 | A1* | 12/2016 | Bertagnolio | F25B 49/005 62/56 |
| 2017/0089598 | A1* | 3/2017 | Wallace | G05B 23/0218 |
| 2017/0089625 | A1* | 3/2017 | Wallace | F25B 49/02 |

FOREIGN PATENT DOCUMENTS

| | | | | |
|---|---|---|---|---|
| EP | 1 072 847 | A2 | 1/2001 | |
| EP | 2 306 122 | A1 | 4/2011 | |
| EP | 3109573 | A1 * | 12/2016 | ............. F25B 31/00 |
| JP | 2006-162214 | A | 6/2006 | |
| JP | 2007-127406 | A | 5/2007 | |
| JP | 2007-240146 | A | 9/2007 | |
| KR | 10-2013-0119040 | A | 10/2013 | |
| WO | 96/24016 | A1 | 8/1996 | |
| WO | WO-2014199788 | A1 * | 12/2014 | ............. F25B 13/00 |
| WO | WO-2015092845 | A1 * | 6/2015 | ............. F24H 4/02 |

* cited by examiner

REFRIGERATION CYCLE APPARATUS

CROSS REFERENCE TO RELATED APPLICATION

This application is a U.S. national stage application of PCT/JP2016/076200 filed on Sep. 6, 2016, the contents of which are incorporated herein by reference.

TECHNICAL FIELD

The present invention relates to a refrigeration cycle apparatus that controls an outdoor fan under low outside air temperature conditions.

BACKGROUND ART

With conventional air-conditioning apparatuses, during cooling operation under low outside air temperature conditions, the temperature of the heat exchanger in the indoor unit reaches a temperature just short of the freezing temperature. An example of a control used to prevent this situation is to perform intermittent operation such that the compressor is stopped when the temperature of the heat exchanger in the indoor unit drops to a set temperature, and the operation of the compressor is resumed when the temperature of the heat exchanger reaches a predetermined temperature. Under such a control, the high-side pressure (condenser pressure) decreases, and the continued intermittent operation also means that the compressor shell temperature does not readily rise. In some instances, this makes it impossible to provide a sufficient degree of discharge superheat, which is the difference between the compressor shell temperature and the saturation temperature that is calculated from the condenser pressure.

An existing method for providing a sufficient degree of discharge superheat is to reduce the airflow rate of the outdoor fan to raise the high-side pressure to thereby provide a sufficient degree of discharge superheat. In some instances, due to restrictions on the lower limit rotation speed at which the outdoor fan can be used, it may not be possible to sufficiently reduce the airflow rate of the outdoor fan.

Accordingly, with some air-conditioning apparatuses, the airflow rate of the outdoor fan is lowered by switching the operation of the outdoor fan from a continuous operation, during which the outdoor fan is rotated constantly, to an intermittent operation, during which the operation of the outdoor fan is interrupted at given regular intervals. As a result, the airflow rate of the outdoor fan is reduced to raise the high-side pressure to thereby provide a sufficient degree of discharge superheat (see, for example, Patent Literature 1).

Patent Literature 1 discloses an air-conditioning apparatus that employs an inexpensive single-speed induction motor to achieve a high efficiency and stable operation equivalent to that of a brushless DC motor. Patent Literature 1 proposes a technique with which an assumed rotation speed of the outdoor fan is calculated from the outside air temperature and the rotation speed of the compressor, and the calculated assumed rotation speed, together with a fixed value of ON/OFF time for the outdoor fan rotation speed, which is stored in advance in the form of a table, are referenced to control the outdoor fan.

CITATION LIST

Patent Literature

Patent Literature 1: Japanese Unexamined Patent Application Publication No. 2006-162214

SUMMARY OF INVENTION

Technical Problem

With a control method that stores a fixed value of ON/OFF time in a table as with Patent Literature 1, it is difficult to adjust the value of high-side pressure to a target value if, for example, the operating capacity of the indoor unit is subject to changes as with multi-split configurations, or if the outside air temperature is subject to changes. As a result, in some instances, the high-side pressure falls below the target value, making it impossible to provide a sufficient degree of discharge superheat. Since a fixed value of ON/OFF time is used in performing intermittent operation, in some instances, the high-side pressure may rise excessively, resulting in increased input to the compressor and decreased operation efficiency.

The present invention has been made to address the above-mentioned problem, and accordingly it is an object of the present invention to provide a refrigeration cycle apparatus that provides a sufficient degree of discharge superheat while preventing decreases in operation efficiency.

Solution to Problem

A refrigeration cycle apparatus according to an embodiment of the present invention includes a refrigerant circuit in which a compressor, a flow switching device, an outdoor heat exchanger, a pressure reducing device, and an indoor heat exchanger are connected via a refrigerant pipe, a high-side pressure sensor disposed on the discharge side of the compressor to detect the high-side pressure of refrigerant, an outdoor fan that supplies air to the outdoor heat exchanger, a fan driving unit that drives the outdoor fan, and a controller that controls the rotation speed of the fan driving unit. The controller includes a pressure prediction unit that predicts, based on the high-side pressure detected by the high-side pressure sensor, a predicted value of high-side pressure at the elapse of a set time, and an intermittent fan control unit that, if the fan driving unit is running at a set lower limit rotation speed, and if the detected high-side pressure is below a target value, controls the fan driving unit to perform intermittent operation, the intermittent operation being performed by setting an ON time, during which the outdoor fan is driven, and an OFF time, during which the outdoor fan is stopped, such that the predicted value predicted by the pressure prediction unit approaches the target value.

Advantageous Effects of Invention

With the refrigeration cycle apparatus according to an embodiment of the present invention, if the rotation speed of the outdoor fan during cooling operation reaches a set lower limit and the high-side pressure is below a target value, intermittent operation is performed with the ON time and the OFF time allowed to vary. In intermittent operation, the ON time and OFF time of the outdoor fan are set such that a predicted value of high-side pressure approaches the target value. This configuration enables the refrigeration cycle apparatus to lower the airflow rate of the outdoor fan to an optimum value to thereby prevent decreases in the operation efficiency of the compressor while providing a sufficient degree of discharge superheat.

DESCRIPTION OF EMBODIMENTS

Embodiment 1

<General Arrangement of Air-Conditioning Apparatus>

Figure 1:
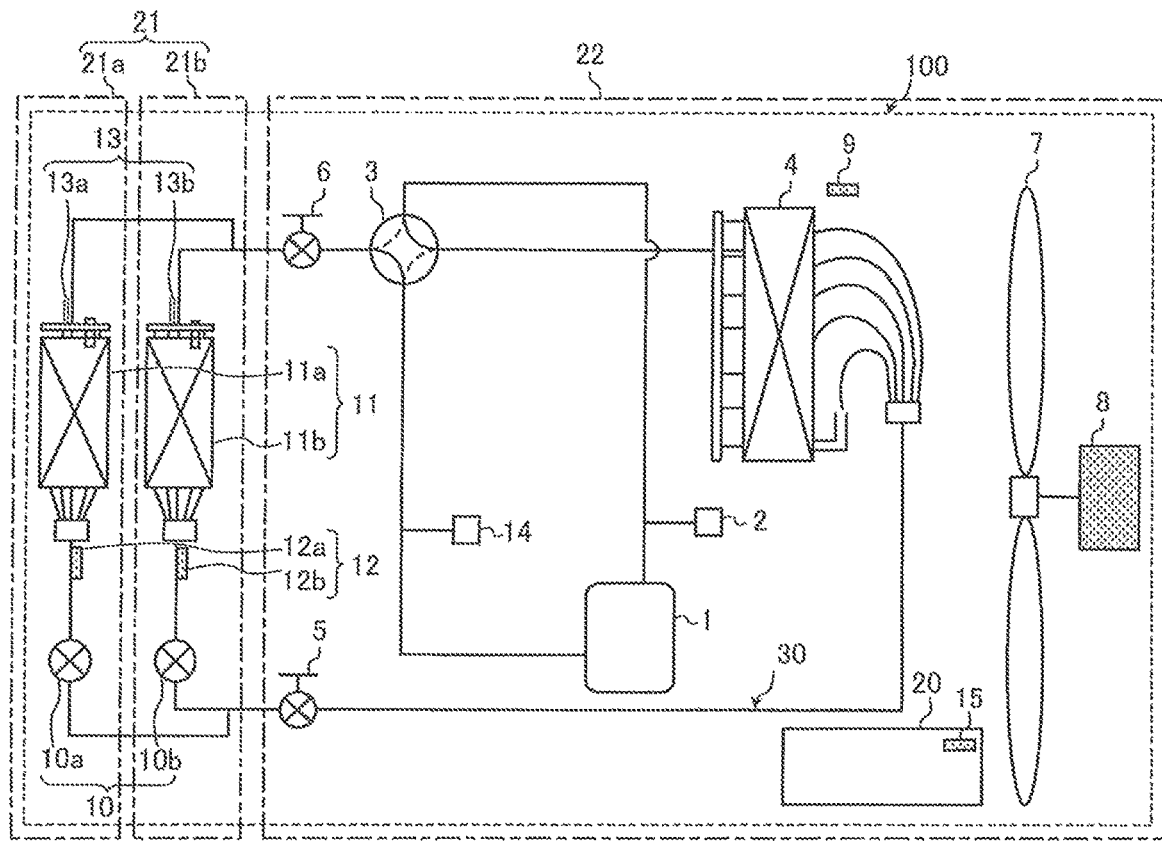
FIG. 1 illustrates the circulation path of refrigerant in an air-conditioning apparatus equipped with a refrigeration cycle apparatus according to Embodiment 1 of the present invention.

FIG. 1 illustrates the circulation path of refrigerant in an air-conditioning apparatus equipped with a refrigeration cycle apparatus 100 according to Embodiment 1 of the present invention. As illustrated in FIG. 1, the air-conditioning apparatus includes an indoor unit 21 and an outdoor unit 22.

The outdoor unit 22 includes a compressor 1, a flow switching device 3, an outdoor heat exchanger 4, a first stationary valve 5, and a second stationary valve 6 that are connected by a refrigerant pipe. The compressor 1 sucks in refrigerant, compresses the sucked refrigerant into a high-temperature, high-pressure state, and transports the resulting refrigerant to a refrigerant circuit 30. The flow switching device 3 is disposed downstream of the compressor 1 to switch the flows of refrigerant between heating operation mode and cooling operation mode. The outdoor heat exchanger 4 performs heat exchange between air and refrigerant. The outdoor heat exchanger 4 acts as a condenser in cooling operation, and acts as an evaporator in heating operation.

The outdoor unit 22 includes various sensors such as a pressure sensor and a temperature sensor, and a controller 20 implemented by a circuit board, a microcomputer, and other components. The controller 20 is electrically connected with various sensors, the flow switching device 3, and other components. Examples of the various sensors included in the outdoor unit 22 include an outside air temperature sensor 9, a board temperature sensor 15, a high-side pressure sensor 2, and a low-side pressure sensor 14. The outside air temperature sensor 9 detects the temperature of outdoor air as outside air temperature, and the board temperature sensor 15 detects the board temperature of the controller 20. The high-side pressure sensor 2 is disposed on the discharge side of the compressor 1 to detect the high-side pressure of the refrigerant (condenser pressure). The low-side pressure sensor 14 is disposed on the suction side of the compressor 1 to detect the low-side pressure of the refrigerant (evaporator pressure).

The outdoor unit 22 includes an outdoor fan 7 and a fan driving unit 8. The outdoor fan 7 is implemented by, for example, a propeller fan, and supplies air to the outdoor heat exchanger 4. The fan driving unit 8 is implemented by, for example, a motor, and drives the outdoor fan. The outdoor fan 7 also supplies air to the controller 20 disposed in the outdoor unit 22 to cool the board of the controller 20.

The indoor unit 21 has a pressure reducing device 10 and an indoor heat exchanger 11 that are connected by a refrigerant pipe. The indoor heat exchanger 11 performs heat exchange between the air sent by a fan (not illustrated), and the refrigerant. The indoor heat exchanger 11 acts as an evaporator in cooling operation, and acts as a condenser in heating operation. The pressure reducing device 10 is implemented by, for example, an expansion valve, and reduces the pressure of the refrigerant to cause the refrigerant to expand.

The indoor unit 21 includes various temperature sensors. As with various sensors and other components of the outdoor unit 22, the various sensors and the pressure reducing device 10 of the indoor unit 21 are also electrically connected with the controller 20. As a temperature sensor of the indoor unit 21, for example, an evaporator temperature sensor is disposed in the indoor heat exchanger 11 to detect evaporator temperature. In FIG. 1, the evaporator temperature sensor includes an indoor liquid-pipe temperature sensor 12 disposed over a liquid pipe, and an indoor gas-pipe temperature sensor 13 disposed over a gas pipe.

FIG. 1 depicts an air-conditioning apparatus including a plurality of indoor units 21a and 21b. The indoor units 21a and 21b are connected in parallel by a refrigerant pipe between the first stationary valve 5 and the second stationary valve 6. In the indoor units 21a and 21b, indoor heat exchangers 11a and 11b are respectively connected with pressure reducing devices 10a and 10b, and the indoor heat exchangers 11a and 11b are respectively provided with indoor liquid-pipe temperature sensors 12a and 12b and indoor gas-pipe temperature sensors 13a and 13b.

The compressor 1, the flow switching device 3, the outdoor heat exchanger 4, the first stationary valve 5, the pressure reducing device 10, the indoor heat exchanger 11, and the second stationary valve 6 are sequentially connected by a pipe to form a refrigeration cycle in which refrigerant is circulated. Examples of the refrigerant used include an R410A refrigerant and an R32 refrigerant, which are similar in melting capacity.

The controller 20 controls operations of the refrigerant circuit 30, the outdoor fan 7, and other components. Specifically, based on detection values obtained from various sensors, the controller 20 controls the capacity of the compressor 1, the opening degree of the pressure reducing device 10, the driving of the outdoor fan 7, and other operational states.

Figure 2:
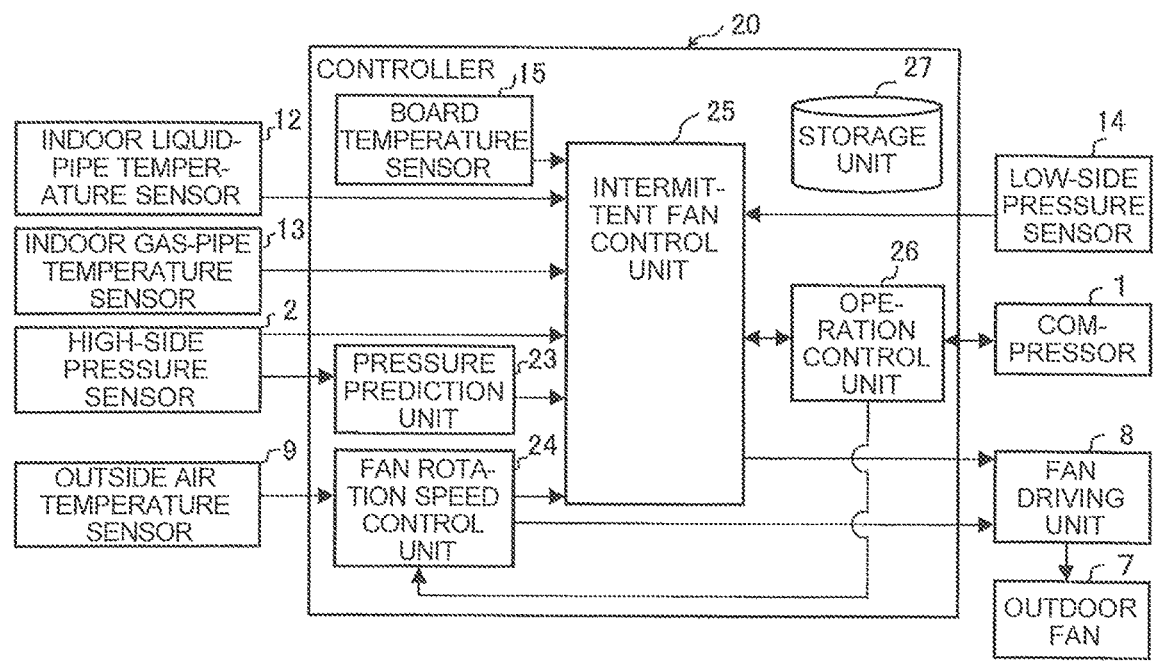
FIG. 2 is a block diagram illustrating the functional configuration of a controller of the refrigeration cycle apparatus according to Embodiment 1 of the present invention.
Figure 3:
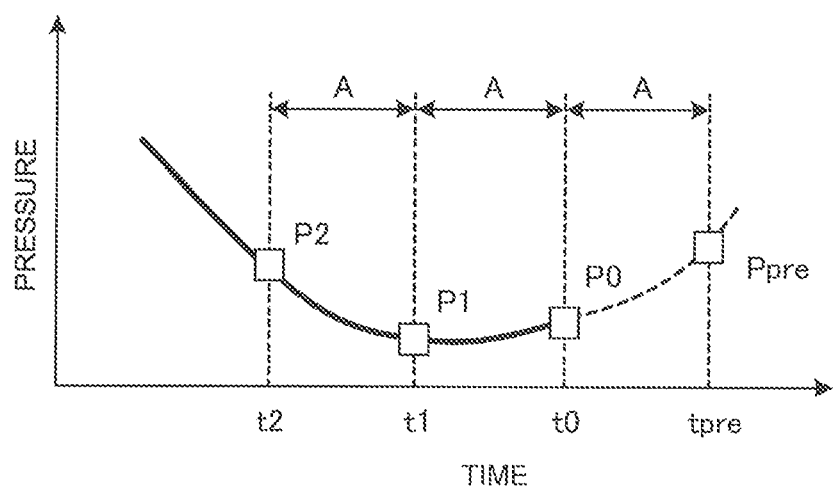
FIG. 3 is a diagram illustrating the relationship between time and pressure to explain pressure prediction performed by the controller according to Embodiment 1 of the present invention.

FIG. 2 is a block diagram illustrating the functional configuration of the controller of the refrigeration cycle apparatus according to Embodiment 1 of the present invention. FIG. 3 is a diagram illustrating the relationship between time and pressure to explain pressure prediction performed by the controller according to Embodiment 1 of the present invention. The function of the controller 20 will be described with reference to FIG. 2 and FIG. 3.

The controller 20 includes a pressure prediction unit 23, a fan rotation speed control unit 24, an intermittent fan control unit 25, an operation control unit 26, and a storage unit 27. The fan rotation speed control unit 24 is configured to vary the rotation speed of the outdoor fan 7 based on the outside air temperature detected by the outside air temperature sensor 9, and the capacity at which the indoor unit 21 being currently connected is operating. Specifically, the fan rotation speed control unit 24 outputs a rotation speed based on the outside air temperature and the operating capacity of the indoor unit 21 to the fan driving unit 8 as a control signal. The fan driving unit 8 drives the outdoor fan 7 at a rotation speed that is based on the control signal. For example, in situations where only a small amount of heat exchange is required between the refrigerant and the outside air, such as when the outside air temperature is low or when the operating capacity of the indoor unit being currently connected is low, the fan rotation speed control unit 24 lowers the rotation speed of the fan driving unit 8. For the fan driving unit 8, a range of usable rotation speeds is set, and a lower limit is placed on the usable rotation speed.

The pressure prediction unit 23 is configured to predict, based on a high-side pressure detected by the high-side pressure sensor 2, a predicted value of high-side pressure at the elapse of a set time (for example, "A" seconds). As illustrated in FIG. 3, while the compressor 1 is running, the pressure prediction unit 23 calculates, for example, a predicted value Ppre at "A" seconds after the current time, t0, based on a value detected by the high-side pressure sensor 2. Specifically, the value detected by the high-side pressure sensor 2 is sampled at predetermined intervals of time (for example, "A" seconds). Then, for example, from a detection value P2 at "2A" seconds before the current time t0, a detection value P1 at "A" seconds before the current time t0, and a detection value P0 at the current time t0, a predicted value Ppre at "A" seconds after the current time t0 is calculated. The pressure prediction unit 23 calculates the predicted value Ppre based on, for example, changes in gradient between a plurality of detection values P0, P1, and P2.

The intermittent fan control unit 25 controls intermittent operation of the outdoor fan 7. The intermittent fan control unit 25 acquires a control rotation speed for the fan driving unit 8 from the fan rotation speed control unit 24, and acquires the predicted value Ppre of high-side pressure from the pressure prediction unit 23. The intermittent fan control unit 25 switches the operation of the outdoor fan 7 from continuous operation to intermittent operation if the fan driving unit 8 is running at the lower limit rotation speed, and if the high-side pressure detected by the high-side pressure sensor 2 is below a target high-side pressure. Specifically, the intermittent fan control unit 25 sets an ON time and an OFF time in such a way that the predicted value approaches the target value, and controls the fan driving unit 8 in accordance with the ON time and OFF time thus set. During intermittent operation, the intermittent fan control unit 25 updates the ON time or OFF time at set time intervals, and operates the outdoor fan 7 in accordance with the ON time and OFF time thus updated. The intermittent fan control unit 25 allows the ON time or OFF time to be varied to vary the amount of air supplied to the outdoor heat exchanger 4. The amount of heat to be exchanged is thus increased or decreased, making it possible for the intermittent fan control unit 25 to adjust the high-side pressure toward the target value.

The intermittent fan control unit 25 also acquires values such as a high-side pressure detected by the high-side pressure sensor 2, an evaporating temperature detected by the evaporator temperature sensor, and a board temperature detected by the board temperature sensor 15. The intermittent fan control unit 25 is configured to determine the state of each component device of the refrigeration cycle apparatus 100 based on the detection values acquired from various sensors, and upon detecting an abnormality, for example, correct the ON time or OFF time that has been set.

The operation control unit 26 controls each component device of the refrigeration cycle, such as the compressor 1. The operation control unit 26 and each of the indoor units 21a and 21b are configured to transmit and receive a signal to and from each other. During intermittent operation, the operation control unit 26 receives operational information about the intermittent operation from the intermittent fan control unit 25, and transmits, to the intermittent fan control unit 25, information about the capacity of the indoor unit being currently connected.

The storage unit 27 is implemented by a memory or other components, and stores information such as setting control information and various initial values. Information stored in the storage unit 27 is referenced by the pressure prediction unit 23, the fan rotation speed control unit 24, the intermittent fan control unit 25, and the operation control unit 26.

Figure 4:
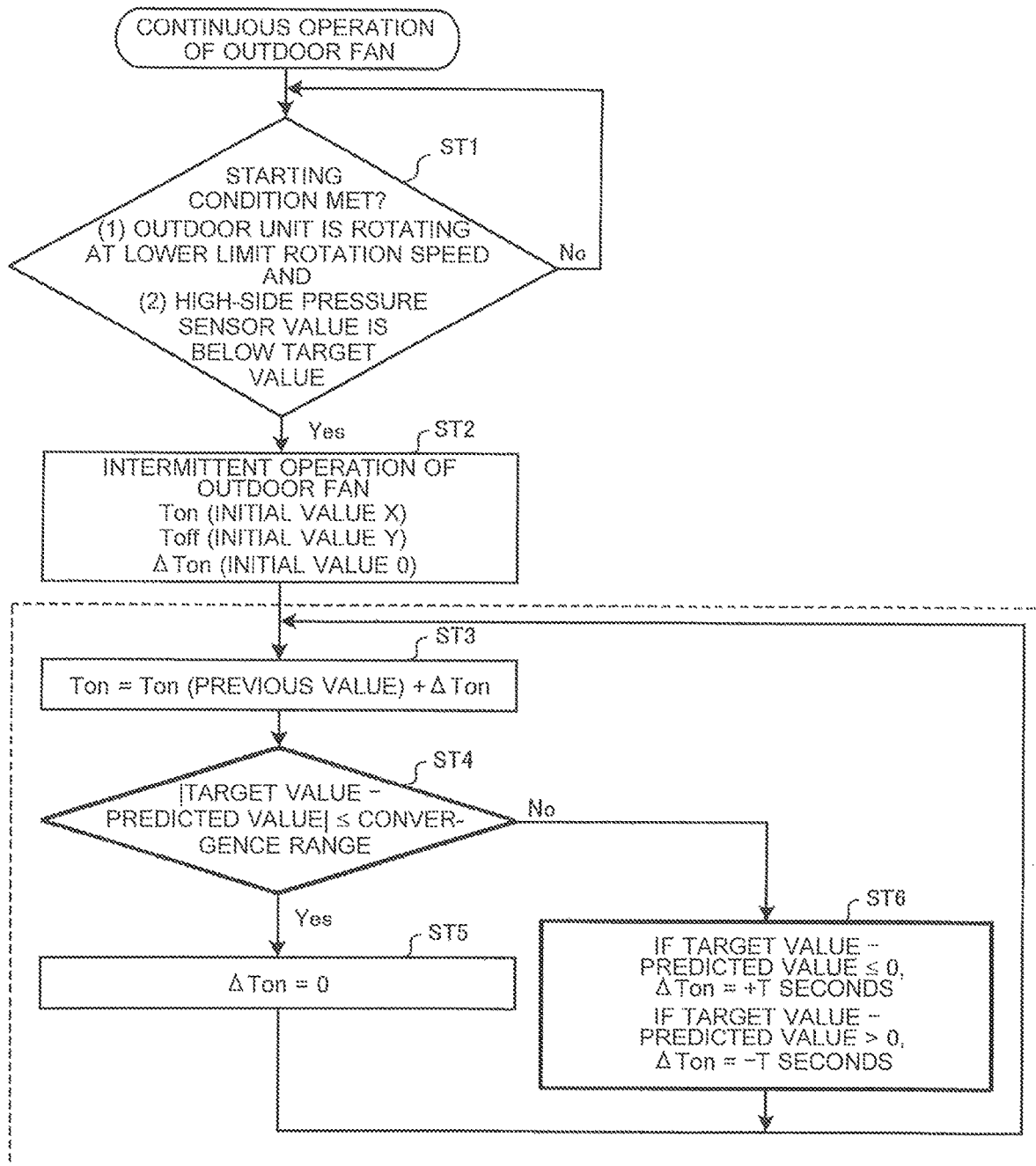
FIG. 4 is a flowchart illustrating operation of an outdoor fan of the air-conditioning apparatus according to Embodiment 1 of the present invention.

FIG. 4 is a flowchart illustrating operation of the outdoor fan of the air-conditioning apparatus according to Embodiment 1 of the present invention. Referring to FIG. 4, a control with which the controller 20 adjusts the ON time of the outdoor fan 7 while keeping the OFF time constant will be described.

Now, the outdoor fan 7 is operating continuously while having its rotation speed controlled by the fan rotation speed control unit 24. In cooling operation, the intermittent fan control unit 25 determines whether a condition for starting intermittent operation of the outdoor fan 7 is met. Specifically, the intermittent fan control unit 25 determines whether the outdoor fan 7 is rotating at the lower limit rotation speed, and whether the high-side pressure is below a target value (step ST1). If the condition for starting intermittent operation is not met (step ST1; No), the continuous operation is continued. If the condition for starting intermittent operation is met (step ST1; Yes), the intermittent fan control unit 25 references the storage unit 27, and sets initial values individually for an ON time Ton, an OFF time Toff, and an ON-time variation amount ΔTon (step ST2). FIG. 4 depicts a case where an initial value X is set for the ON time Ton, an initial value Y is set for the OFF time Toff, and an initial value 0 is set for the ON-time variation amount ΔTon.

The intermittent fan control unit 25 repeats steps ST4 to ST6 and step ST3 at set intervals of time (for example, Z-minute intervals) so that a predicted value of high-side pressure approaches a target value. Thus, the ON time Ton is updated and changed at the set time intervals (Z-minute intervals). At this time, a predicted value is regarded as falling within a convergence range when the absolute value of the difference between the target and predicted values of high-side pressure is close to zero and equal to or less than a set value. The intermittent fan control unit 25 determines the value of ON-time variation amount ΔTon based on the predicted value predicted by the pressure prediction unit 23 and the target value, and adds the determined ON-time variation amount ΔTon to the previous ON time Ton to set the ON time Ton to be used next. The intermittent fan control unit 25 repeats this control. The initial value of ON-time variation amount ΔTon is zero. Thus, at the time when step ST3 is performed for the first time after operation is switched to intermittent operation, the ON time Ton is equal to the initial value X.

At step ST4, the intermittent fan control unit 25 determines whether the difference between the predicted and target values of high-side pressure is within the convergence range (step ST4). If the difference between the predicted and target values is within the convergence range (step ST4; Yes), the intermittent fan control unit 25 sets the ON-time variation amount ΔTon to zero (step ST5), and if the difference between the predicted and target values is greater than the convergence range (step ST4; No), the process transfers to step ST6. Then, if the predicted value is less than the target value, the intermittent fan control unit 25 sets the ON-time variation amount ΔTon to −T, and if the predicted value is equal to or greater than the target value, the intermittent fan control unit 25 sets the ON-time variation amount ΔTon to +T. After determining the ON-time variation amount ΔTon at step ST5 or ST6, the process returns to step ST3 again, where the intermittent fan control unit 25 adds the determined ON-time variation amount ΔTon to the ON time Ton to update the ON time Ton. The intermittent fan control unit 25 controls the outdoor fan 7 to perform intermittent operation in accordance with the newly set ON time Ton.

That is, if the difference between the target and predicted values is within the convergence range, the ON-time variation amount ΔTon is determined to be zero, and for the next Z minutes, intermittent operation of the outdoor fan 7 is performed with the ON time Ton set to the same as the previous value. If the difference between the target and predicted values is outside the convergence range, the ON time Ton is set such that the predicted value approaches the target value. At this time, if the predicted value is less than the target value, intermittent operation is performed for the next Z minutes with the ON time Ton set shorter than the previous value, and if the predicted value is equal to or greater than the target value, intermittent operation is performed for the next Z minutes with the ON time Ton set longer than the previous value.

Figure 5:
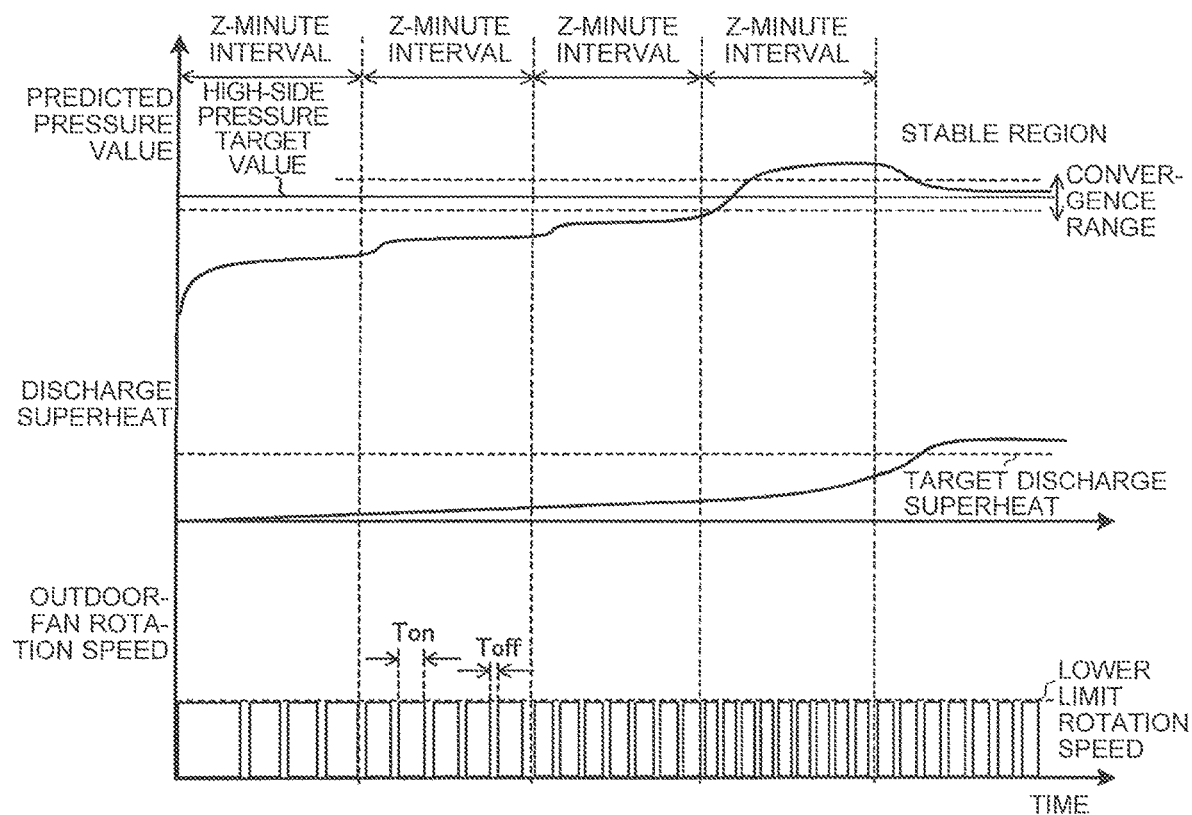
FIG. 5 is a diagram illustrating the relationship between time, the value of high-side pressure, and the rotation speed of the outdoor fan to explain a control performed by the controller according to Embodiment 1 of the present invention.

FIG. 5 is a diagram illustrating the relationship between time, the value of high-side pressure, and the rotation speed of the outdoor fan to explain a control performed by the controller according to Embodiment 1 of the present invention. Referring to FIG. 5, the following describes adjustment of the high-side pressure for a case where the ON time Ton is adjusted with the OFF time Toff kept constant.

In FIG. 5, the horizontal axis represents time elapsed, and the vertical axis represents, from the bottom, the control rotation speed for the outdoor fan, the degree of discharge superheat of refrigerant, and the predicted value of high-side pressure at the elapse of a set time (for example, "A" seconds). At this time, the air-conditioning apparatus is performing cooling operation with the compressor 1 running, and the outdoor fan 7 is being controlled via the fan driving unit 8 to operate at the lower limit rotation speed. Since the high-side pressure is below a target value, the controller 20 switches the operation of the outdoor fan 7 from continuous operation to intermittent operation.

In the first Z minutes, the predicted value of high-side pressure is outside the convergence range including the target value, and is below the target value. Thus, for the next Z minutes, an ON time Ton shorter than the previous value is set so that the degree of discharge superheat approaches a target degree of discharge superheat, and the predicted value of high-side pressure approaches the target value. However, in the second Z-minute interval, the predicted value of high-side pressure is still outside the convergence range. Thus, for the third Z-minute interval, the ON time Ton is set even shorter than that in the second Z-minute interval so that the airflow rate is reduced. Even in the third Z-minute interval, the predicted value of high-side pressure is still outside the convergence range and below the target value. Thus, for the fourth Z-minute interval, the ON time Ton is set even shorter than that in the third Z-minute interval. In the fourth Z-minute interval, the predicted value of high-side pressure rises above the target value, and moves outside the convergence range. Thus, for the fifth Z-minute interval, the ON time Ton is set longer than that in the fourth Z-minute interval. Once the predicted value of high-side pressure falls within the convergence range, the ON time Ton at this time is maintained.

In this way, the ON time Ton of the outdoor fan 7 is updated at set time intervals such that a predicted value of high-side pressure approaches a target value, and the ON time Ton converges to a value such that the difference between the predicted and target values of high-side pressure falls within the convergence range.

The controller 20 performs various controls in addition to the adjustment mentioned above to ensure that the refrigeration cycle apparatus 100 as a whole maintains stable operation even during intermittent operation of the outdoor fan 7. For example, the operation control unit 26 sets an upper limit on the rotation speed of the compressor 1, and, during intermittent operation, the operation control unit 26 controls the compressor to operate at a rotation speed equal to or lower than the set upper limit.

Further, during the intermittent operation, the intermittent fan control unit 25 corrects the ON time Ton or OFF time Toff such that the low-side pressure detected by the low-side pressure sensor 14 is greater than the freezing pressure. For example, the intermittent fan control unit 25 sets, as a lower limit on the low-side pressure, a pressure value just short of freezing, and applies a correction if the value detected by the low-side pressure sensor 14 reaches the set lower limit. Specifically, the intermittent fan control unit 25 decreases the ON time Ton or increases the OFF time Toff until the low-side pressure becomes greater than the set lower limit.

Further, during the intermittent operation, the intermittent fan control unit 25 corrects the ON time Ton or OFF time Toff such that the evaporator temperature detected by the indoor liquid-pipe temperature sensor 12 or the indoor gas-pipe temperature sensor 13 is higher than the freezing temperature. For example, the intermittent fan control unit 25 sets, as a lower limit on the evaporating temperature, a temperature just short of freezing, and applies a correction if the detected evaporating temperature reaches the set lower limit. Specifically, the intermittent fan control unit 25 decreases the ON time Ton or increases the OFF time Toff until the evaporating temperature becomes greater than the set lower limit.

Further, during the intermittent operation, the intermittent fan control unit 25 corrects the ON time Ton or OFF time Toff to prevent the board temperature detected by the board temperature sensor 15 from increasing excessively. For example, the intermittent fan control unit 25 sets, on the board temperature, a threshold higher than the range of temperatures normally used, and applies a correction if the value detected by the board temperature sensor 15 reaches the set threshold. Specifically, the intermittent fan control unit 25 increases the ON time Ton or decreases the OFF time Toff until the board temperature becomes lower than the set threshold. If the board temperature does not drop below the set threshold even after the correction is continued, the intermittent fan control unit 25 switches the operation of the outdoor fan 7 from intermittent operation to continuous operation to provide a sufficient rate of airflow.

Further, during the intermittent operation, the intermittent fan control unit 25 corrects the ON time Ton or OFF time Toff to prevent the high-side pressure detected by the high-side pressure sensor 2 from increasing excessively. For example, the intermittent fan control unit 25 sets, on the high-side pressure, a threshold higher than the range of temperatures normally used, and applies a correction if the value detected by the high-side pressure sensor 2 reaches the set threshold. Specifically, the intermittent fan control unit 25 increases the ON time Ton or decreases the OFF time Toff until the high-side pressure becomes lower than the set threshold. If the high-side pressure does not drop below the set threshold even after the correction is continued, the intermittent fan control unit 25 switches the operation of the outdoor fan 7 from intermittent operation to continuous operation to provide a sufficient rate of airflow.

In Embodiment 1, the refrigeration cycle apparatus 100 includes the refrigerant circuit 30, the high-side pressure sensor 2, the outdoor fan 7, the fan driving unit 8, and the controller 20. The controller includes the pressure prediction unit 23 that predicts, based on the high-side pressure detected by the high-side pressure sensor 2, a predicted value Ppre of high-side pressure at the elapse of a set time, and the intermittent fan control unit 25 that, if the fan driving unit 8 is running at a rotation speed equal to a set lower limit, and if the detected high-side pressure is below a target value, controls the fan driving unit to perform intermittent operation, the intermittent operation being performed by setting the ON time Ton, during which the outdoor fan 7 is driven, and the OFF time Toff, during which the outdoor fan 7 is stopped, such that the predicted value predicted by the pressure prediction unit 23 approaches the target value.

With the refrigeration cycle apparatus 100 configured as described above, the ON time Ton and OFF time Toff of the fan driving unit 8 are set individually. As a result, unlike conventional refrigeration cycle apparatuses with which intermittent operation is performed by using a fixed value of ON/OFF time, the refrigeration cycle apparatus 100 makes it possible to adjust the airflow rate of the outdoor fan 7 to a value such that the high-side pressure approaches the target value. This enables the refrigeration cycle apparatus 100 to provide a sufficient degree of discharge superheat while preventing the input to the compressor 1 from increasing due to excess increases in high-side pressure.

The refrigeration cycle apparatus 100 further includes the outside air temperature sensor 9 that detects an outside air temperature, and the fan rotation speed control unit 24 that, during cooling operation in which the indoor heat exchanger 11 acts as an evaporator, adjusts the rotation speed of the fan driving unit 8 based on the outside air temperature detected by the outside air temperature sensor 9 and the operating capacity of the indoor unit 21.

This enables the refrigeration cycle apparatus 100 to provide a sufficient degree of discharge superheat while preventing the input to the compressor 1 from increasing, even when the outside air temperature is subject to changes, or when, for example, the operating capacity of the indoor unit 21 is subject to changes as in the case of multi-split configurations.

Further, the intermittent fan control unit 25 repeatedly sets the ON time Ton, and the ON time Ton is adjusted from the ON time Ton set last time, such that the predicted value Ppre approaches the target value. As a result, of the ON time Ton and the OFF time Toff, the ON time Ton is increased or decreased with the OFF time Toff kept constant. Since the ratio between the ON and OFF times is set based on the predicted and target values, the rate of airflow supplied to the outdoor heat exchanger 4 is adjusted. This configuration enables the refrigeration cycle apparatus 100 to provide a target degree of discharge superheat.

Further, the controller 20 further includes the operation control unit 26 that, during intermittent operation, controls the compressor 1 to operate at a rotation speed equal to or lower than a set upper limit. As a result, during intermittent operation in which the ON time Ton and the OFF time Toff are set, the operation control unit 26 places a limit on increases in the rotation speed of the compressor 1 to minimize unnecessary increases in the input to the compressor 1.

Further, the refrigeration cycle apparatus 100 further includes the low-side pressure sensor 14 disposed on the suction side of the compressor 1 to detect the low-side pressure of refrigerant, and, during the intermittent operation, the intermittent fan control unit 25 corrects the ON time Ton or OFF time Toff that has been set, such that the low-side pressure detected by the low-side pressure sensor 14 is greater than the freezing pressure. This enables the refrigeration cycle apparatus 100 to prevent the suction pipe or other components from freezing as a result of refrigerant pressure on the low-pressure side of the refrigeration cycle decreasing to a value equal to or lower than the freezing pressure.

The refrigeration cycle apparatus 100 further includes the evaporator temperature sensor that detects the evaporator temperature of the indoor heat exchanger 11, and, during the intermittent operation, the intermittent fan control unit 25 corrects the ON time Ton or OFF time Toff that has been set, such that the evaporator temperature detected by the evaporator temperature sensor is higher than the freezing temperature. This enables the refrigeration cycle apparatus 100 to prevent the indoor heat exchanger 11 that acts as an evaporator during cooling operation from freezing as a result of the evaporator temperature of the indoor heat exchanger 11 decreasing to a temperature equal to or lower than the freezing temperature.

The refrigeration cycle apparatus 100 further includes the board temperature sensor 15 that detects the board temperature of the controller 20, the outdoor fan 7 supplies air to the outdoor heat exchanger 4 and cools the controller 20, and, during the intermittent operation, the intermittent fan control unit 25 corrects the ON time Ton or OFF time Toff that has been set, such that the board temperature detected by the board temperature sensor 15 is lower than a set threshold. As a result, during intermittent operation in which the ON time Ton and the OFF time Toff are set, if, for example, the board temperature has risen to a set threshold, the intermittent fan control unit 25 corrects the ON time Ton such that the ON time Ton increases. This allows the outdoor fan 7 to provide a sufficient rate of airflow for cooling the controller 20, and the board temperature thus decreases. Therefore, even when the outdoor fan 7 is operated intermittently, the refrigeration cycle apparatus 100 is able to prevent damage to the controller 20 due to heat, thus ensuring normal operation.

Further, during the intermittent operation, the intermittent fan control unit 25 corrects the ON time Ton or OFF time Toff that has been set, such that the high-side pressure is less than a set threshold. As a result, during the intermittent operation in which the ON time Ton and the OFF time Toff are set, if, for example, the high-side pressure has risen to a set threshold, the intermittent fan control unit 25 applies a correction that increases the ON time Ton, so that the high-side pressure that has risen excessively can be lowered. This ensures safe operation of the refrigeration cycle apparatus 100 even when the outdoor fan 7 is operated intermittently.

Embodiment 2

The refrigeration cycle apparatus 100 according to Embodiment 2 is of the same configuration as that in Embodiment 1, and included in an air-conditioning apparatus configured in the same manner as in Embodiment 1. It is also assumed that the configuration of the refrigeration cycle apparatus 100 according to Embodiment 2 is the same as that illustrated in FIGS. 1 to 3. In Embodiment 1, the controller 20 is configured to change the ON time Ton at predetermined intervals of time to provide a target degree of discharge superheat. By contrast, in Embodiment 2, the controller 20 is configured to change the OFF time Toff at predetermined intervals of time.

Figure 6:
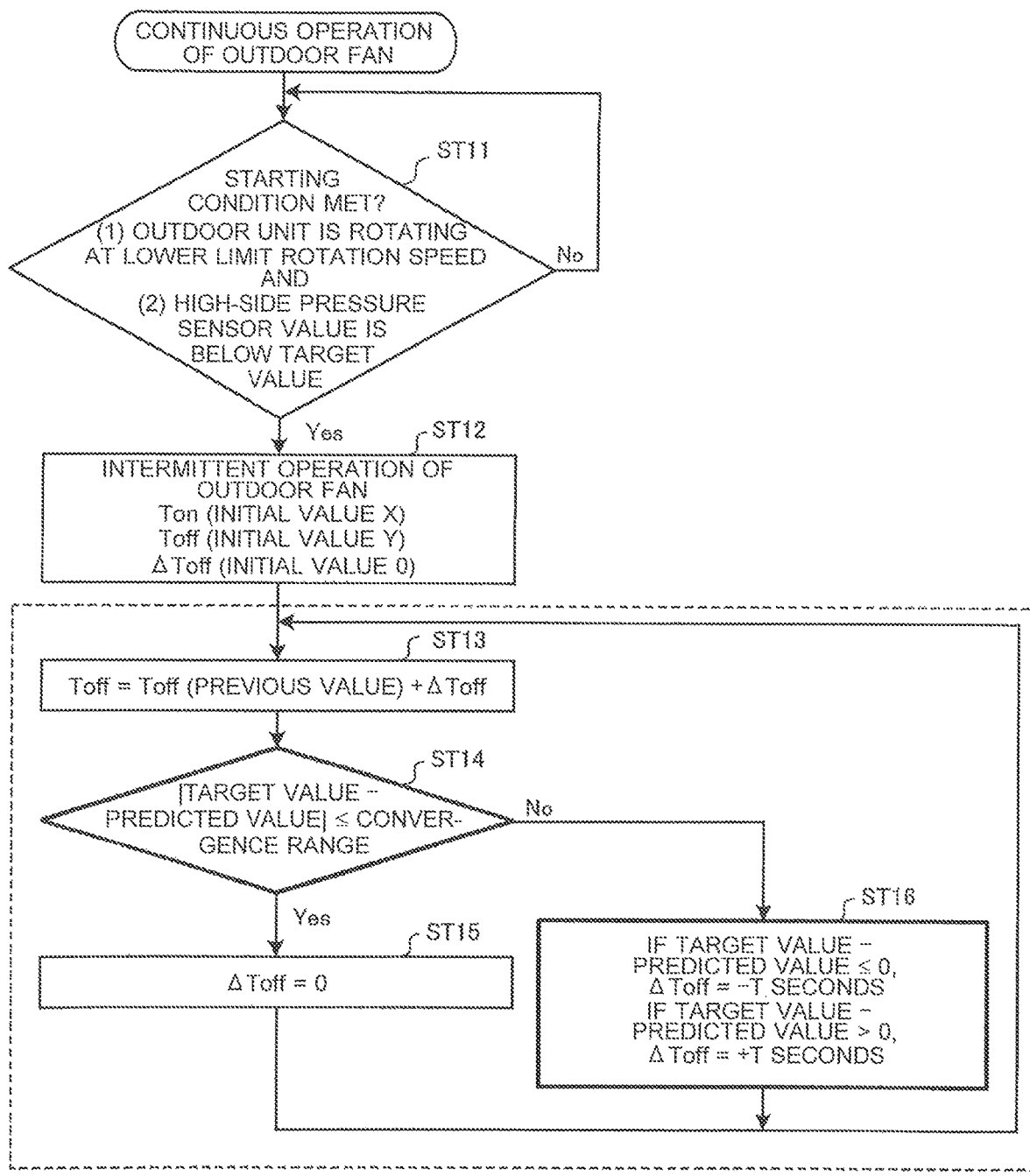
FIG. 6 is a flowchart illustrating operation of the outdoor fan of an air-conditioning apparatus according to Embodiment 2 of the present invention.

FIG. 6 is a flowchart illustrating operation of the outdoor fan of the air-conditioning apparatus according to Embodiment 2 of the present invention. Referring to FIG. 6, a control with which the controller 20 adjusts the OFF time Toff of the outdoor fan 7 while keeping the ON time Ton constant will be described.

Now, the fan rotation speed control unit 24 is performing continuous operation of the outdoor fan 7 while adjusting the rotation speed of the outdoor fan 7. While the compressor 1 is running during cooling operation, the intermittent fan control unit 25 determines whether a condition for starting intermittent operation of the outdoor fan 7 is met (step ST11). Step ST11 is the same as step ST1 in FIG. 4, and hence will not be described in further detail. If the condition for starting intermittent operation is met (step ST11; Yes), the intermittent fan control unit 25 sets initial values individually for an ON time Ton, an OFF time Toff, and an OFF-time variation amount ΔToff (step ST12). FIG. 6 depicts a case where an initial value X is set for the ON time Ton, an initial value Y is set for the OFF time Toff, and an initial value 0 is set for the OFF-time variation amount ΔToff.

The intermittent fan control unit 25 repeatedly executes steps ST14 to ST16 and step ST13 at set intervals of time (for example, Z-minute intervals) so that a predicted value of high-side pressure approaches a target value. At this time, the OFF time Toff is updated and changed at the set time intervals (Z-minute intervals). The intermittent fan control unit 25 determines the value of OFF-time variation amount ΔToff based on the predicted value predicted by the pressure prediction unit 23 and the target value, and adds the determined OFF-time variation amount ΔToff to the previous OFF time Toff to set the OFF time Toff to be used next. The initial value of OFF-time variation amount ΔToff is zero. Thus, at the time when step ST13 is performed for the first time after operation is switched to intermittent operation, the OFF time Toff is equal to the initial value Y.

At step ST14, the intermittent fan control unit 25 determines whether the difference between the predicted and target values of high-side pressure is within the convergence range (step ST14). If the difference between the predicted and target values is within the convergence range (step ST14; Yes), the intermittent fan control unit 25 sets the OFF-time variation amount ΔToff to zero (step ST15), and if the difference between the predicted and target values is outside the convergence range (step ST14; No), the process transfers to step ST16. Then, if the predicted value is less than the target value, the intermittent fan control unit 25 sets the OFF-time variation amount ΔToff to +T, and if the predicted value is equal to or greater than the target value, the intermittent fan control unit 25 sets the OFF-time variation amount ΔToff to −T. After determining the OFF-time variation amount ΔToff at step ST15 or ST16, the process returns to step ST13 again, where the intermittent fan control unit 25 adds the determined OFF-time variation amount ΔToff to the OFF time Toff to update the OFF time Toff. The intermittent fan control unit 25 then performs intermittent operation of the outdoor fan 7 in accordance with the newly set OFF time Toff.

That is, if the difference between the target and predicted values is within the convergence range, the OFF-time variation amount ΔToff is determined to be zero, and for the next Z minutes, intermittent operation of the outdoor fan 7 is performed with the OFF time Toff set to the same as the previous value. If the difference between the target and predicted values is outside the convergence range, the OFF time Toff is set such that the predicted value approaches the target value. At this time, if the predicted value is less than the target value, intermittent operation is performed for the next Z minutes with the OFF time Toff set longer than the previous value, and if the predicted value is equal to or greater than the target value, intermittent operation is performed for the next Z minutes with the OFF time Toff set shorter than the previous value.

As in Embodiment 1, the refrigeration cycle apparatus 100 according to Embodiment 2 includes the refrigerant circuit 30, the high-side pressure sensor 2, the outdoor fan 7, the fan driving unit 8, and the controller 20. The controller includes the pressure prediction unit 23 that predicts, based on the high-side pressure detected by the high-side pressure sensor 2, a predicted value Ppre of high-side pressure at the elapse of a set time, and the intermittent fan control unit 25 that, if the fan driving unit 8 is running at a rotation speed equal to a set lower limit, and if the detected high-side pressure is below a target value, controls the fan driving unit to perform intermittent operation, the intermittent operation being performed by setting the ON time Ton, during which the outdoor fan 7 is driven, and the OFF time Toff, during which the outdoor fan 7 is stopped, such that the predicted value predicted by the pressure prediction unit 23 approaches the target value.

As in Embodiment 1, with the refrigeration cycle apparatus 100 according to Embodiment 2 configured as described above, the ON time Ton and OFF time Toff of the fan driving unit 8 are set individually, thus allowing the airflow rate of the outdoor fan 7 to be adjusted to a value such that the high-side pressure approaches the target value. This enables the refrigeration cycle apparatus 100 to provide a sufficient degree of discharge superheat while preventing the input to the compressor 1 from increasing due to excess increases in high-side pressure.

The intermittent fan control unit 25 repeatedly sets the OFF time Toff, and the OFF time Toff is adjusted from the OFF time Toff set last time, such that the predicted value Ppre approaches the target value. As a result, of the ON time Ton and the OFF time Toff, the OFF time Toff is increased or decreased with the ON time Ton kept constant. Since the ratio between the ON and OFF times is set based on the predicted and target values, the rate of airflow supplied to the outdoor heat exchanger 4 is adjusted. This configuration enables the refrigeration cycle apparatus 100 to provide a target degree of discharge superheat.

The present invention is not limited to the above embodiments, but capable of various modifications. Although the foregoing description is directed to a case where, for example, the air-conditioning apparatus includes the plurality of indoor units 21a and 21b, the air-conditioning apparatus may include a single indoor unit 21.

Although in the foregoing description an increase or decrease in ON time Ton and an increase or decrease in OFF time Toff are indicated by the respective signs (plus or minus) of the ON-time variation amount ΔTon and OFF-time variation amount ΔToff, the magnitude of such an increase or decrease, |T|, may be set as a variable. For example, the intermittent fan control unit may vary the magnitude of an increase or decrease |T| in accordance with the difference between the target and predicted values of high-side pressure, the number of times the adjusting control is repeated, the difference in the direction of increase or decrease between the last time and the current time, or other factors. This configuration makes it possible to adjust the predicted value of high-side pressure to the target value with improved accuracy, and shorten the time required for the predicted value to converge to a value within the convergence range.

REFERENCE SIGNS LIST 1 compressor 2 high-side pressure sensor 3 flow switching device 4 outdoor heat exchanger 5 first stationary valve 6 second stationary valve 7 outdoor fan 8 fan driving unit 9 outside air temperature sensor 10, 10a, 10b pressure reducing device 11, 11a, 11b indoor heat exchanger 12, 12a, 12b indoor liquid-pipe temperature sensor 13, 13a, 13b indoor gas-pipe temperature sensor 14 low-side pressure sensor 15 board temperature sensor 20 controller 21, 21a, 21b indoor unit 22 outdoor unit 23 pressure prediction unit 24 fan rotation speed control unit 25 intermittent fan control unit 26 operation control unit 27 storage unit 30 refrigerant circuit 100 refrigeration cycle apparatus P0 to P2 detected value Ppre predicted value Ton ON time Toff OFF time ΔTon ON-time variation amount ΔToff OFF-time variation amount

The invention claimed is:

1. A refrigeration cycle apparatus comprising:
a refrigerant circuit in which a compressor, a flow switching device, an outdoor heat exchanger, a pressure reducing device, and an indoor heat exchanger are connected via a refrigerant pipe;
a high-side pressure sensor disposed on a discharge side of the compressor to detect a high-side pressure of refrigerant;
an outdoor fan that supplies air to the outdoor heat exchanger;
a fan driving unit that drives the outdoor fan; and
a controller configured to control a rotation speed of the fan driving unit,
wherein the controller is configured to
predict, based on the high-side pressure detected by the high-side pressure sensor, a predicted value of high-side pressure at an elapse of a set time, and
if the fan driving unit is running at a set lower limit rotation speed, and if the detected high-side pressure is below a target value, control the fan driving unit to perform intermittent operation, the intermittent operation being performed by setting an ON time, during which the outdoor fan is driven, and an OFF time, during which the outdoor fan is stopped, such that the predicted value approaches the target value.

2. The refrigeration cycle apparatus of claim 1, further comprising:
an outside air temperature sensor that detects an outside air temperature; and
the controller, during cooling operation in which the indoor heat exchanger acts as an evaporator, controls the fan driving unit to perform continuous operation, the continuous operation being performed by adjusting a rotation speed of the fan driving unit based on the outside air temperature detected by the outside air temperature sensor and an operating capacity of an indoor unit.

3. The refrigeration cycle apparatus of claim 1,
wherein the controller repeatedly sets the ON time, and
wherein the ON time is adjusted from the ON time set last time, such that the predicted value approaches the target value.

4. The refrigeration cycle apparatus of claim 1,
wherein the controller repeatedly sets the OFF time, and
wherein the OFF time is adjusted from the OFF time set last time, such that the predicted value approaches the target value.

5. The refrigeration cycle apparatus of claim 1,
wherein the controller, during the intermittent operation, controls the compressor to operate at a rotation speed equal to or lower than a set upper limit.

6. The refrigeration cycle apparatus of claim 1, further comprising
a low-side pressure sensor disposed on a suction side of the compressor to detect a low-side pressure of the refrigerant,
wherein during the intermittent operation, the controller corrects the set ON time or the set OFF time such that the low-side pressure detected by the low-side pressure sensor is greater than a freezing pressure.

7. The refrigeration cycle apparatus of claim 1, further comprising
an evaporator temperature sensor that detects an evaporator temperature of the indoor heat exchanger,
wherein during the intermittent operation, the controller corrects the set ON time or the set OFF time such that the evaporator temperature detected by the evaporator temperature sensor is higher than a freezing temperature.

8. The refrigeration cycle apparatus of claim 1, further comprising
a board temperature sensor that detects a board temperature of the controller,
wherein the outdoor fan supplies air to the outdoor heat exchanger, and cools the controller, and
wherein during the intermittent operation, the controller corrects the set ON time or the set OFF time such that the board temperature detected by the board temperature sensor is lower than a set threshold.

9. The refrigeration cycle apparatus of claim 1,
wherein during the intermittent operation, the controller corrects the set ON time or the set OFF time such that the high-side pressure is less than a set threshold.

* * * * *